B. C. COONS.
PARING MACHINE.
APPLICATION FILED MAR. 28, 1921.

1,430,628.

Patented Oct. 3, 1922.

INVENTOR.
Burton C. Coons
BY
Davis & Simms
his ATTORNEYS.

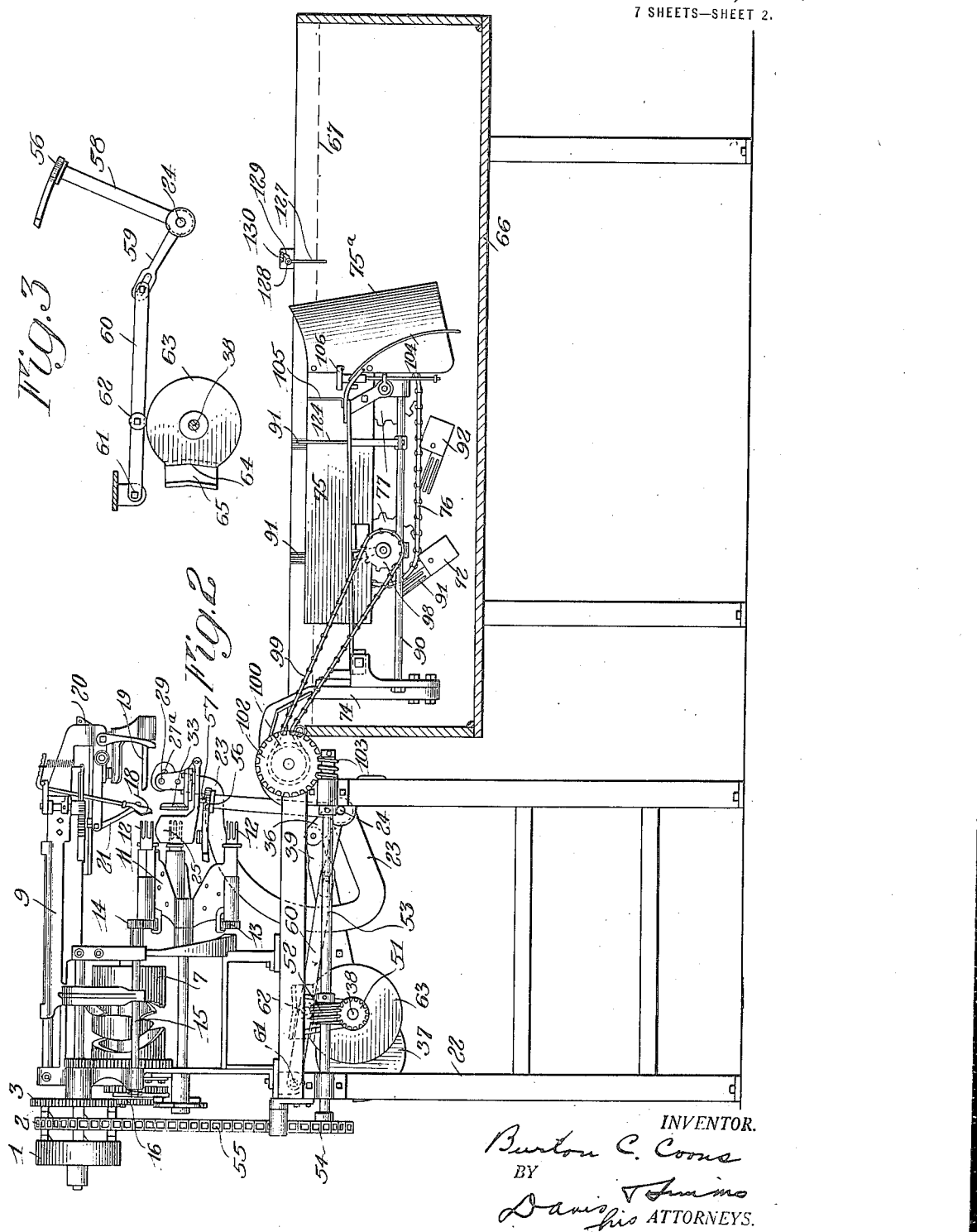

B. C. COONS.
PARING MACHINE.
APPLICATION FILED MAR. 28, 1921.

1,430,628.

Patented Oct. 3, 1922.
7 SHEETS—SHEET 3.

INVENTOR.
Burton C. Coons
BY
Davis & Simms
his ATTORNEYS.

B. C. COONS.
PARING MACHINE.
APPLICATION FILED MAR. 28, 1921.

1,430,628.

Patented Oct. 3, 1922.
7 SHEETS—SHEET 4.

INVENTOR.
Burton C. Coons
by Davis & Simms
his ATTORNEYS.

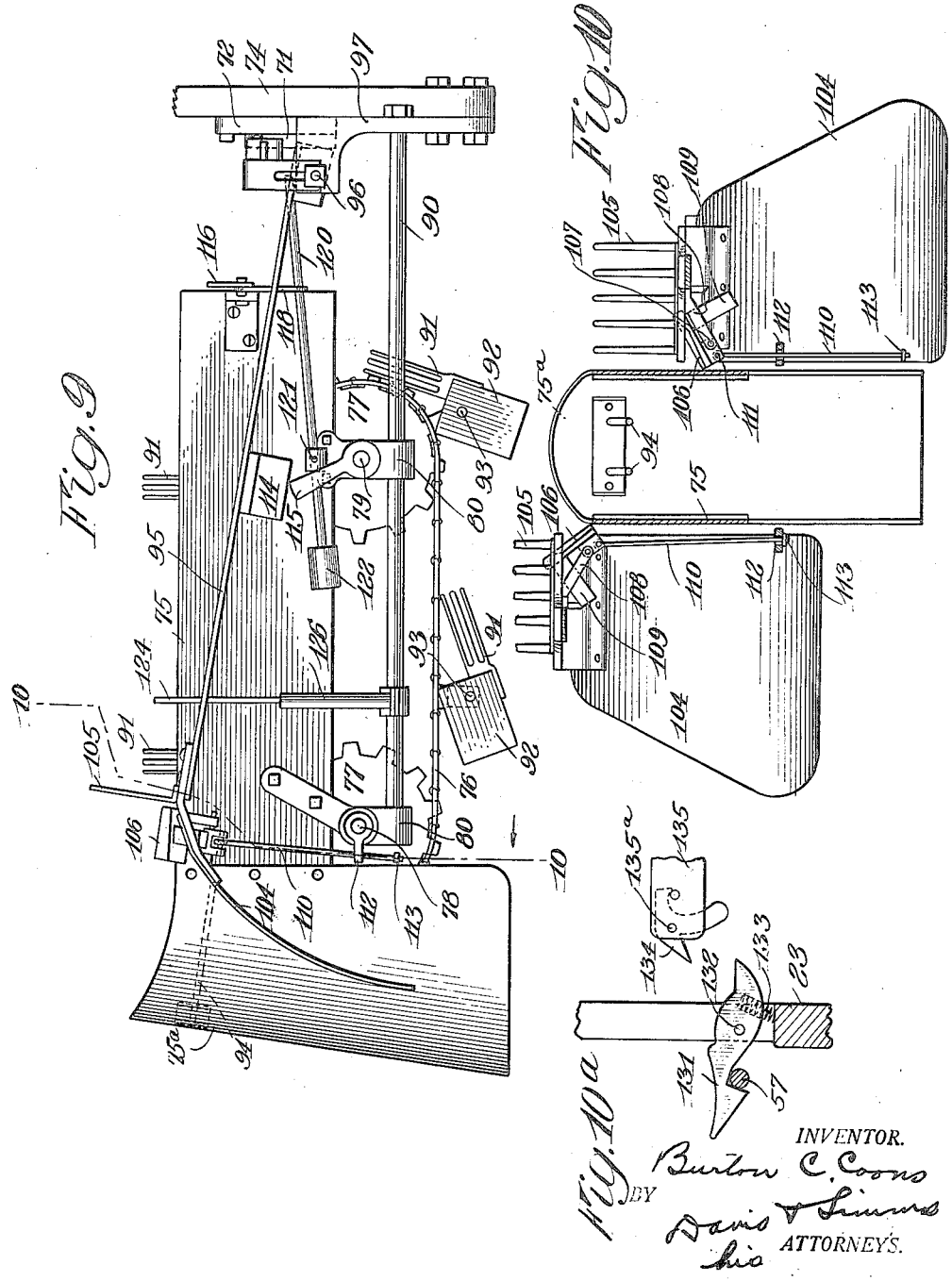

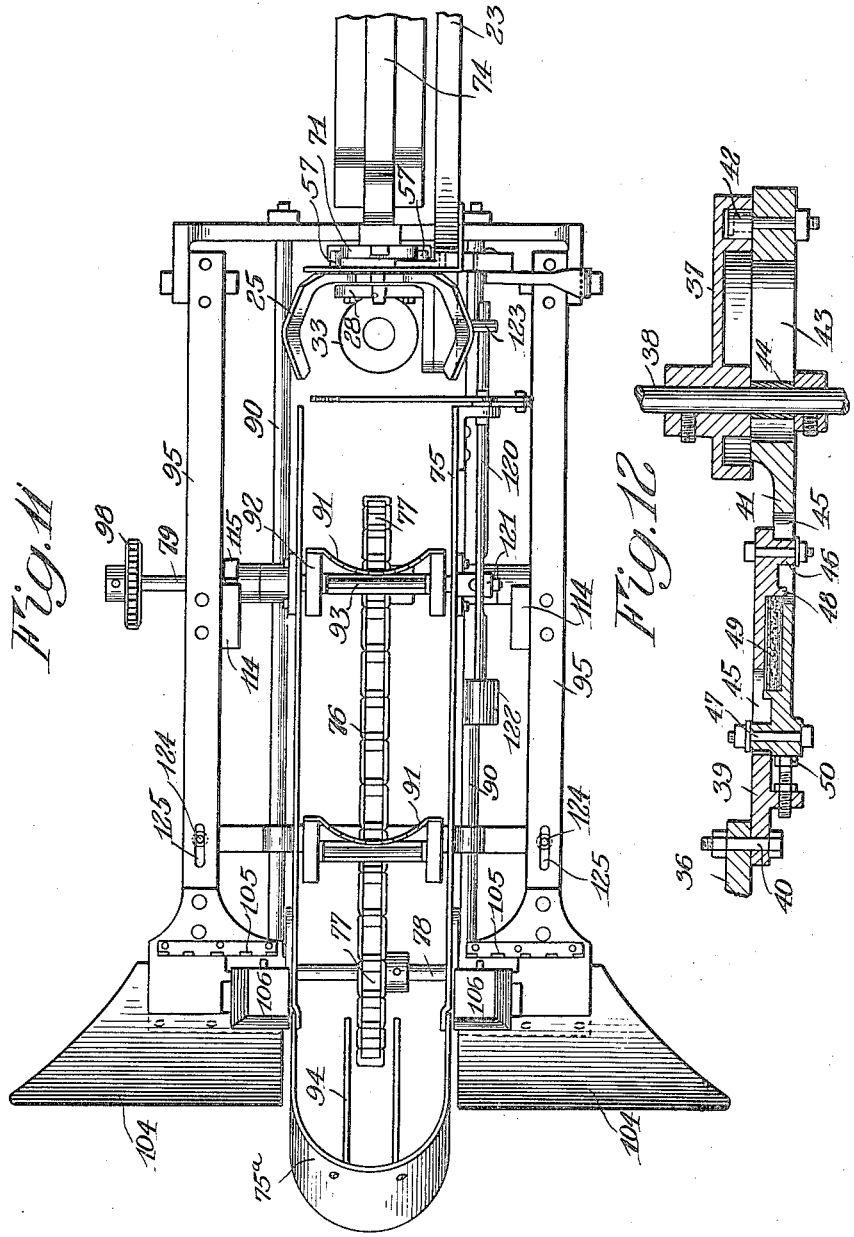

B. C. COONS.
PARING MACHINE.
APPLICATION FILED MAR. 28, 1921.
1,430,628.
Patented Oct. 3, 1922.
7 SHEETS—SHEET 7.
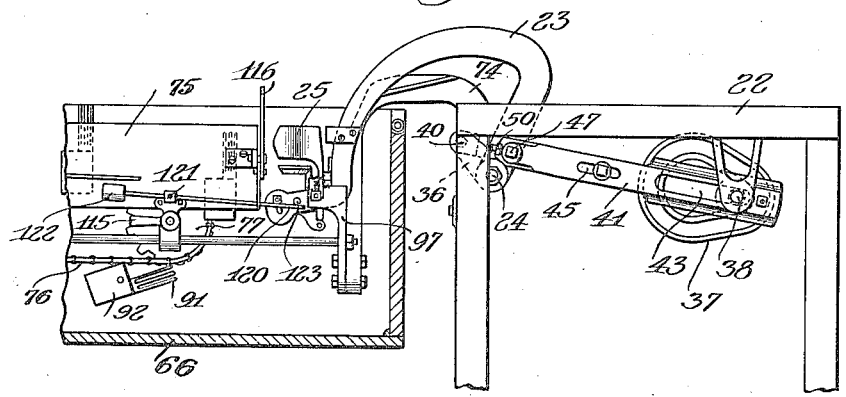
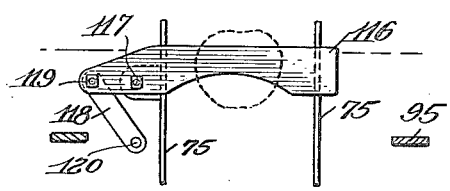
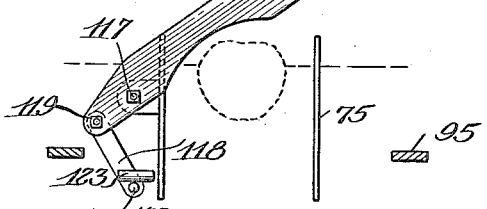
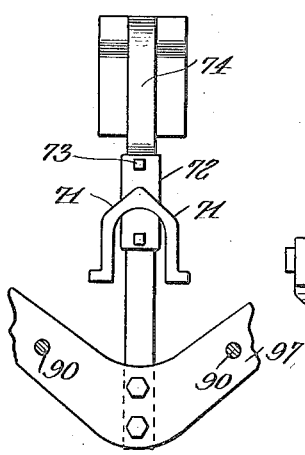
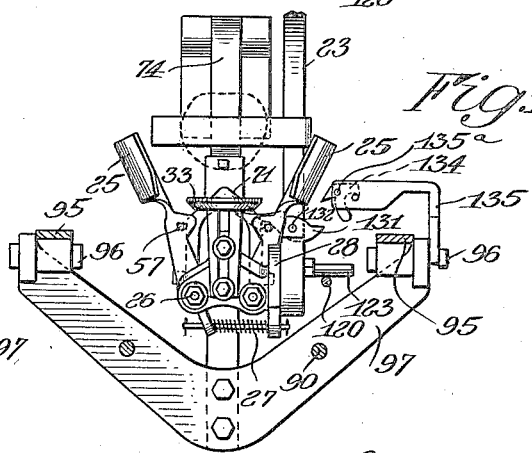
INVENTOR.
Burton C. Coons
BY Davis & Timms
his ATTORNEYS.

Patented Oct. 3, 1922.

1,430,628

UNITED STATES PATENT OFFICE.

BURTON C. COONS, OF ROCHESTER, NEW YORK.

PARING MACHINE.

Application filed March 28, 1921. Serial No. 456,337.

*To all whom it may concern:*

Be it known that I, BURTON C. COONS, a citizen of the United States, and resident of Rochester, in the county of Monroe and State of New York, have invented certain new and useful Improvements in Paring Machines, of which the following is a specification.

The present invention relates to paring machines and more particularly to the type in which the fruit to be pared is arranged, during the paring operation, upon a supporting device preferably in the form of a fork, an object of this invention being to provide a novel mechanism for automatically feeding the apples one at a time from bulk to the supporting device in properly timed relation to the operation of the paring mechanism, the apples being centered through such automatic means upon the supporting device. Another object of the invention is to provide a novel impaling mechanism which first centers the fruit and thereafter impales the same upon the supporting device. Another object of the invention is to provide the impaling mechanism with means which will permit the yielding of such means for apples of different sizes. Another object of the invention is to provide an impaling means which is movable into a water receptacle to permit apples in said receptacle to float into cooperation with said impaling means. Another object of the invention is to provide a novel means for opening the jaws of the impaling means after the fruit has been impaled upon the supporting device. Still another object is to hold the jaws of the impaling means open after they have been opened to release the apples to the forks so that the jaws will enter the water in open positions ready to receive the floating apples. A still further object of the invention is to provide an improved means for separating apples floating in bulk in a water receptacle and feeding such apples one at a time to a receiving and centering means. A still further object of the invention is to provide in connection with a receiving and centering means arranged in a water receptacle, a compartment into which the apples are lifted from the water receptacle and which has means therein for pushing the apples toward the receiving and centering means. A still further object of the invention is to provide an impaling means movable into a water receptacle which is provided with a compartment having an outlet through which the apples pass to the impaling means as the latter is presented to said outlet. Another and still further object of this invention is to provide an impaling means which has a receiving and centering member movable into the water receptacle to receive fruit from the outlet of a compartment in said receptacle, the outlet to said compartment being controlled through a gate or similar device which prevents the passage of the apples through said outlet, except when the receiving and centering means of the impaling mechanism is in position at said outlet.

To these and other ends the invention consists of certain parts and combinations of parts, all of which will be hereinafter described, the novel features being pointed out in the appended claims.

In the drawings:

Fig. 2 is a view of the opposite side of the machine with the water receptacle in section and the current producing wheel removed;

Fig. 3 is a detail view showing the manner in which the jaws are opened to release the fruit after the impaling operation;

Fig. 9 shows in side elevation the lifting devices and the compartment in which the apples are collected for delivery to the holding means of the impaling mechanism;

Fig. 10 is a section on the line 10—10, Fig. 9;

Figure 1:
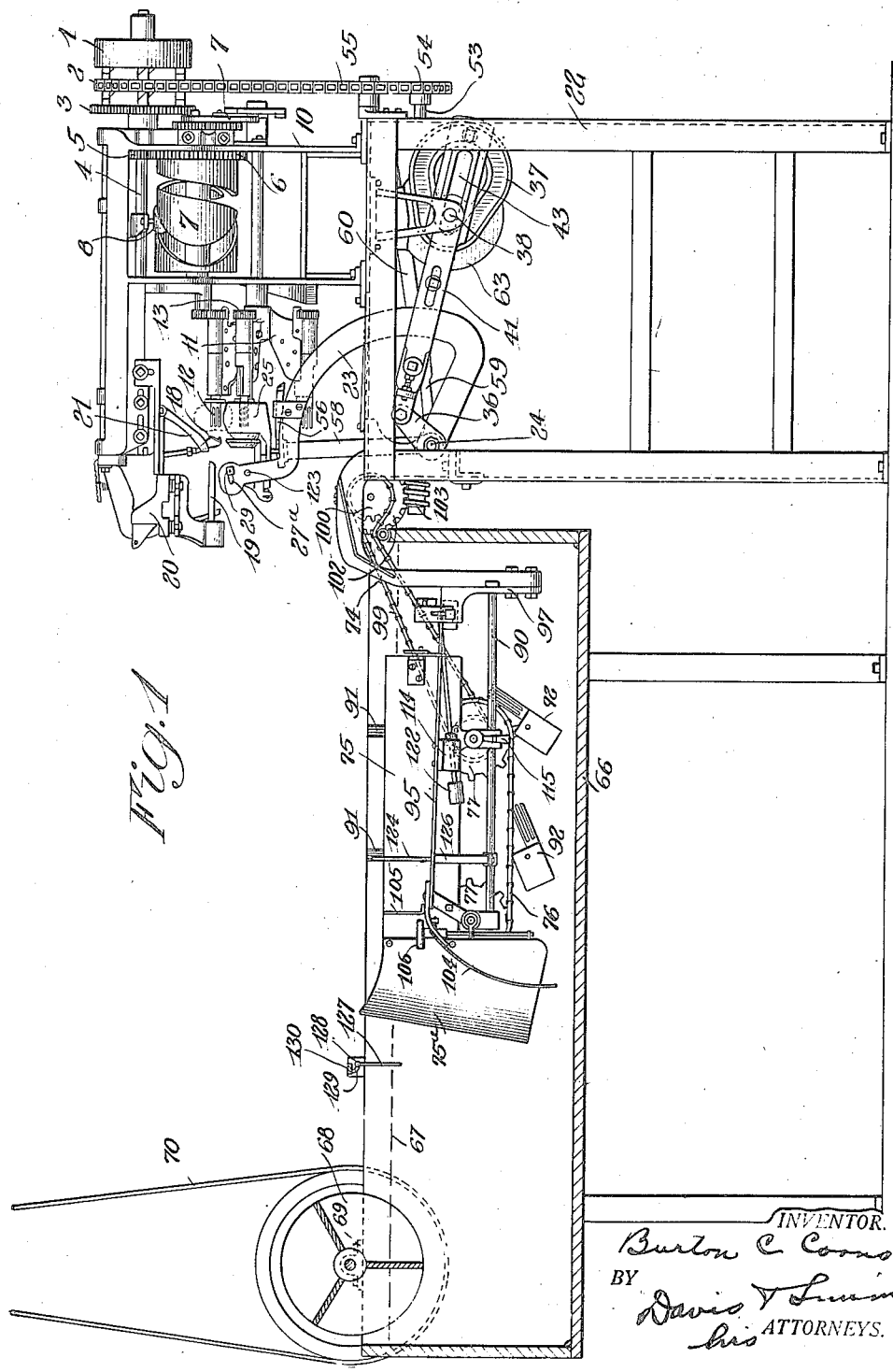
Fig. 1 shows the machine in side elevation with the water receptacle and other parts in vertical section.
Figure 4:
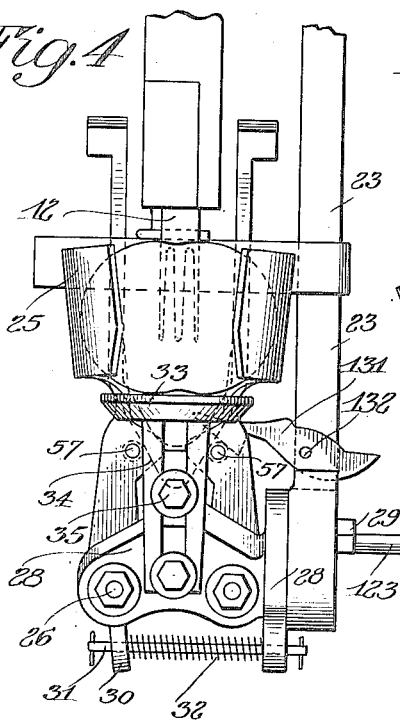
Fig. 4 is an enlarged detail view of the fruit holder of the impaling mechanism showing the position of the parts during the impaling of the fruit on the supporting fork.

Fig. 10ª is a detail view showing the manner in which the holding jaws of the impaling mechanism are released by the detent;

Fig. 11 is an enlarged top view of the lifting devices, the chamber in which the apples are collected, and the mechanism for feeding said apples in the chamber to the holding means of the impaling mechanism;

Fig. 12 is a longitudinal section through the pitman which operates the impaling arm;

Fig. 13 is a fragmentary view partially in section showing the manner in which the impaling mechanism operates the gate at the inner end of the chamber in the receptacle;

Fig. 14 is a detail view showing the receptacle gate closed;

Fig. 15 is a similar view showing the receptacle gate open;

Fig. 16 is a fragmentary view showing the arm which projects from the base frame and carries the camming device for opening the jaws of the holding means in the water receptacle; and Fig. 17 is a view showing the position of the holding jaws to receive the floating fruit.

In the illustrated embodiment of the invention there has been combined with substantially the mechanism illustrated in my U. S. Patent No. 1,168,788, dated January 18, 1916, an improved mechanism for feeding apples to the apple supporting forks or devices on which the fruit is pared. It is understood however, that the invention is not limited to the machine illustrated in my aforesaid patent. This machine is generally illustrated in this application and will be generally described, but should the operation of the mechanism not be clear, reference to the aforesaid patent may be had.

The mechanism of my aforesaid patent generally comprises a pulley 1 to which the power may be connected. This pulley is adapted to move axially and to interlock with a sprocket wheel 2 and a gear 3. The gear 3 turns on a shaft 4 and carries a pinion 5 adapted to mesh with a pinion 6 which is secured to a cam drum 7 with which a follower 8 co-operates. This follower is connected to a reciprocating carriage 9 operable on the frame 10 on which the drum 7 is mounted. Also mounted on the frame 10 is a rotary reel 11 carrying three article supporting devices 12 in the form of rotary forks which have pinions 13 thereon adapted to connect with a pinion 14 on a shaft 15, the latter having a pinion 16 meshing with the gear 3 whereby, when the pinions 9 are successively brought into mesh with the pinion 14 through an indexing mechanism 17, illustrated in my aforesaid patent, to the pinion 14, said forks will be rotated while they are being operated upon by the paring mechanism. The paring mechanism is fully described in my aforesaid patent and embodies a knife 18 which is swung in an arc through the medium of the carriage 9 for the purpose of paring the apple during the rotation of the latter by one of the forks. After the paring takes place, a coring knife or spoon 19 which is mounted on the frame 20 connected with the carriage 9, moves into the pared apple and cuts the core therefrom after which the carriage 9 moves in the opposite direction and through the pivoted pusher 21 effects the removal of the pared and cored apple from the fork. Immediately thereafter, another fork with an apple thereon is presented to the paring mechanism. No claim is made per se to any of the foregoing parts, as the construction and operation thereof forms the subject matter of my patent previously mentioned.

One of the features of this invention is the mechanism which presents and impales the apples to the forks 12. The frame 10 heretofore mentioned, is bolted or secured to a base frame 22 on which an arm 23 is pivotally mounted at 24. This arm is, in this instance, arched or crooked and carries at its outer end the receiving and holding means for the apple. This receiving and holding means preferably embodies two jaws 25 pivoted on different centers 26 and having intermeshing gear portions 27 which cause the jaws to move together. The pivots 25 are preferably provided on a bracket 28 which by bolts 29 is adjustably secured to the arm 23, slots 27ª being provided in the arm about one of the bolts so that the bracket may be adjusted about the other bolts as a pivot. The arm of one of the jaws 25 has an extension 30 which is perforated and receives a rod 31, said rod also being guided in the bracket 28. A helical spring 32 is interposed between the bracket 28 and the perforated extension 30 and acts on the two jaws so as normally to hold them into closed position. This arrangement permits the jaws to accommodate themselves to apples of different sizes. With the end in view of providing a support or rest for the apple between the jaws, there is provided a supporting device 33 which is preferably adjustable in the direction of the core of the apple supported thereon and to this end is provided with a slotted arm 34 in which bolts 35 operate, these bolts being secured to the bracket 28 which is secured to the swinging arm or carrier 23.

To effect the movement of the impaling mechanism there is provided an operating mechanism comprising a short arm 36 on the shaft 24 connected by a pitman with a groove cam 37 which turns with the shaft 38. This pitman is adjustable lengthwise and is also provided with means which will permit its expansion lengthwise. In this instance the pitman comprises a member 39 pivoted at 40 to the arm 36 and a member 41 having a roller 42 which operates in the groove of the cam 37. The member 41 may also be provided with a slot 43 through which the shaft 38 extends, said shaft having a roller 44 thereon which acts as a pivot bearing for the pitman. The members 39 and 41 are preferably connected by providing each of them with a slot 45 and a boss or projection 46 operating in said slot, a bolt 47 passing through said boss or projection and trying each member to the other while at the same time permitting relative longitudinal movement of the members. Each member 39 and 41 is also provided with an abutment 48 and between these two abutments a rubber cushion 49 is arranged. This cushion acts as a yielding means which will permit the expansion of the pitman while at the same time it will also permit the apple impaling mechanism to yield for apples of different sizes. It is preferred to provide an adjustable stop 50 on the member 39 which cooperates with the member 41 in order to limit the relative movement of the members in one direction. The shaft 38 which moves this pitman is supported by the base frame 22 and has at one end a worm 51 which meshes with a worm 52 on a shaft 53 also supported on the base frame 22, this shaft 53 having a sprocket 54 at one end which by a sprocket 55 cooperates with the sprocket wheel 2 heretofore mentioned.

For effecting the opening of the jaws after the fruit has been placed upon a fork 12, an opening means is provided comprising a pair of diverging cam faces 56 which cooperate with projections or pins 57 on the arms of the jaws 25. These cam faces 56 are, in this instance, mounted on a single arm 58 which is pivoted on the shaft 24 and has a slotted arm 59 with which a link or lever 60 is pivotally connected, the other end of this lever being pivotally mounted at 61 to the base frame 22. Between its ends the lever or link 60 is provided with a roller 62 and this roller cooperates with a cam 63 mounted on the shaft 38. The cam 63 embodies preferably, a portion which is concentric with the axis of the shaft 38 and a small portion 64 providing a depression in the cam surface and having adjacent to it a groove 65 in which the roller 62 operates. The groove portion 65 with the depressed portion 64 effects a slight movement of the cam surfaces 56 after the jaws 25 have impaled the fruit upon the fork, the cam surfaces 56 being at other times out of engagement with the pins 57 so that the jaws will be maintained closed on the upward movement of the arm until the opening is desired.

Figure 5:
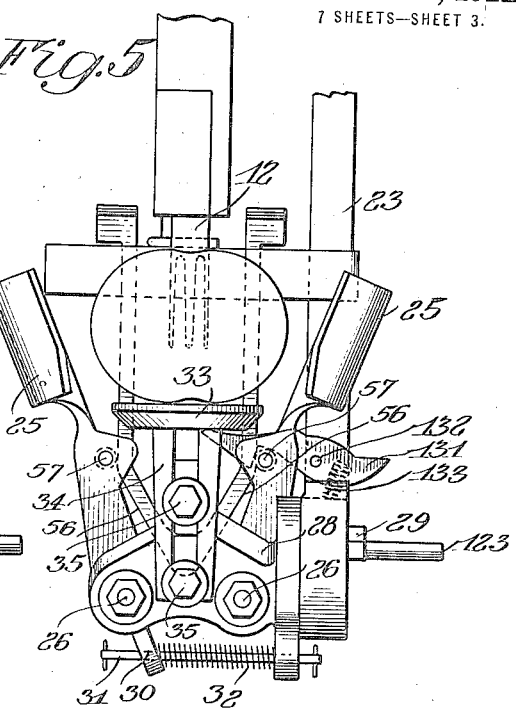
Fig. 5 is a view similar to Fig. 4 showng the position of the parts as the jaws are opened to release the fruit after the impaling.
Figure 6:
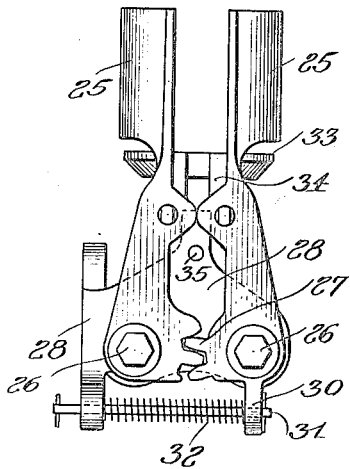
Fig. 6 is a detail view of the fruit holding means from the side opposite that shown in Fig. 4.
Figure 7:
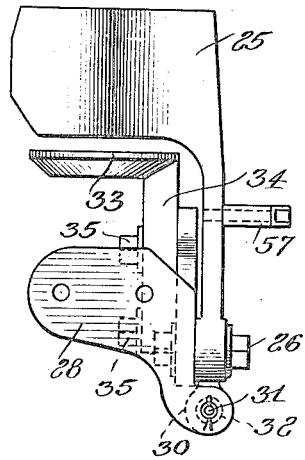
Fig. 7 is a detail view of the fruit holding means from still another side thereof.
Figure 8:
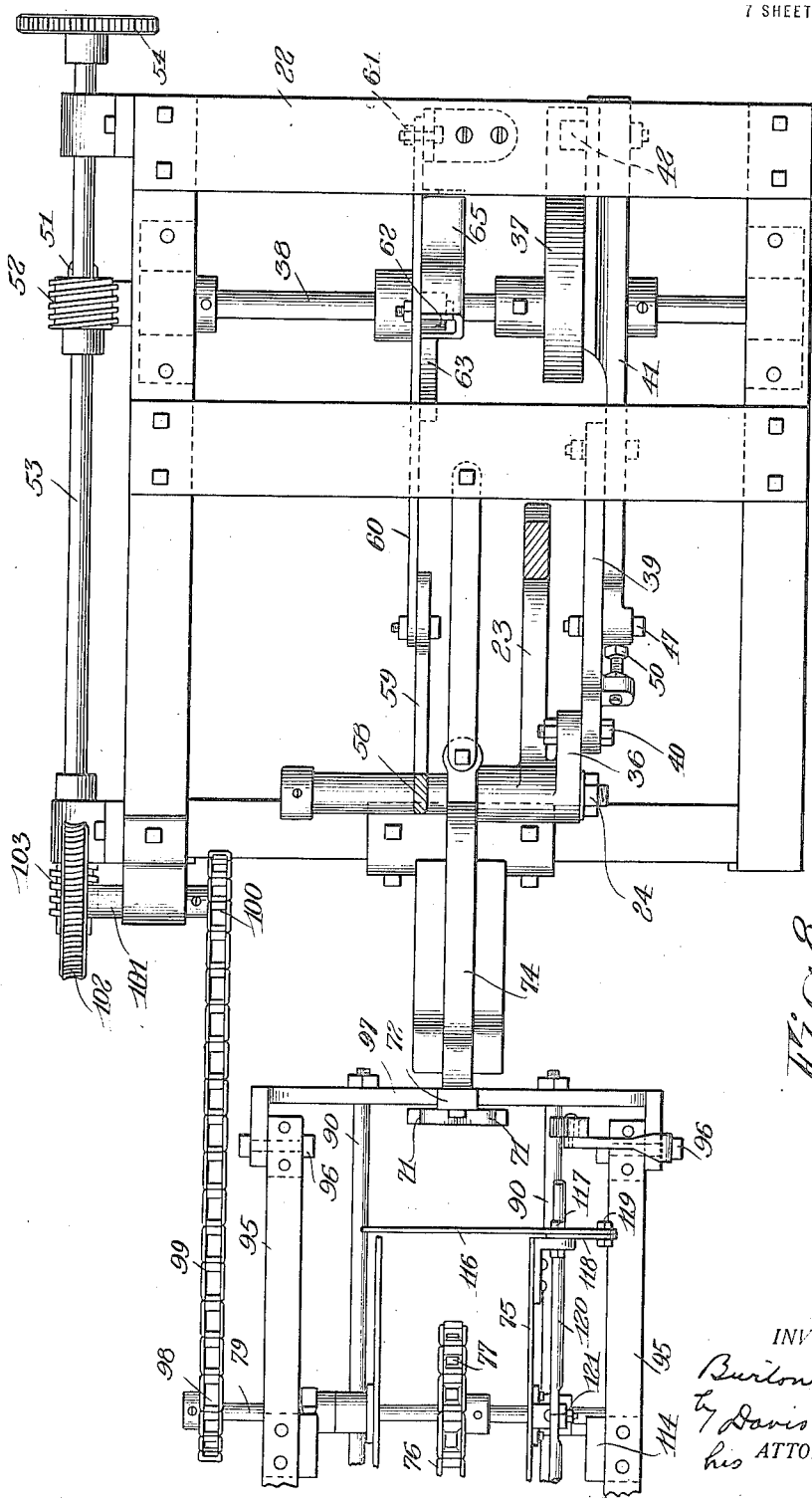
Fig. 8 is an enlarged view showing the base frame in plan, the impaling arm being shown in section and the connection between the base frame and the operating mechanism in the tank being illustrated.

With the end in view of holding the jaws open after they have released the fruit to the forks, so that the jaws move away from the forks in an open position to receive the next apple, there is provided a detaining means comprising, in this instance, a detent 131 pivoted at 132 to the arm 23 and having a hooked nose by which it may engage one of the pins 57 (as shown in Fig. 5) after the jaws have been opened, a spring 133 acting to move the detent to a position where it may engage the pin 57 on the opening of the jaws.

There is provided in connection with the mechanism which impales the fruit upon the supporting device or fork 12, a mechanism which will feed the apples one at a time to the receiving and holding means of such impaling mechanism. This mechanism, in this instance, embodies a tank or receptacle 66 which contains water, preferably to the level indicated in dotted lines at 67. The apples are dumped into this receptacle at the end thereof farthest from the impaling mechanism, and a current is produced by any suitable means in the receptacle for moving the fruit toward the opposite end. This current producing means is, in this instance, in the form of a paddle wheel 68 mounted in bearings 69 on the receptacle 67 and driven through a belt 70 or other suitable means. The water not only washes the fruit, but also causes the apples to float with their cores upright. The receptacle is supported in such a position with reference to the base frame 22 that the arm 23 when in its lowered position will enter the receptacle 66, the crook in the arm permitting this movement. The jaws, when in the receptacle, will project upwardly and the sides of the jaws are so formed that the fruit may enter between the jaws in a plane substantially parallel with the supporting surface of the supporting device 33. The jaws are moved to the tank in an open position and are so held until they leave the tank, but should they fail to be held by the detent 131, they will be opened by an opening device preferably in the form of two cams 71 arranged in diverging relation to each other and carried by brackets 72 which by set screw 73 is adjustably secured to an arm 74, which projects outwardly and then downwardly from the base frame 22, said arm depending into the tank or receptacle 66.

It is desirable to close the jaws 25 of the impaling mechanism after the seat 33 has moved upwardly in the tank a sufficient distance to engage the under side of an apple floating above it and to this end a movable abutment 134 supported by a bracket 135 on the bracket 97 is provided. This abutment is pivoted at 135ª so that on the downward movement of the jaws, it will shift on its pivot by engagement with the detent 131, but upon the first part of the upward movement of the jaws, said abutment will shift the detent and permit the jaws to close on the apple under the action of the spring 27, thus centering the apple on the supporting surface 33 for presentation to the fork.

With the end in view of directing the floating apples to the jaws while the latter are in the tank, there may be provided a pair of plates 75 spaced from each other and connected at their forward ends at 75ª to provide a chamber between them, said plates being also spaced from the bottom and the sides of the tank and extending from the point adjacent the receiving position of the jaws toward the current producing device, but in spaced relation to the latter. The chamber between these plates will direct the apples to the jaws while at the same time the spaces underneath the plate and at their sides permit the water to flow toward the receiving jaws at their upper surfaces while to return at their bottom. The connecting portion 75ª prevents the apples entering between the plates 75. The chamber between the plates provides a receiving chamber into which the apples are delivered in order to be carried to the jaws of the impaling mechanism.

For moving the apples positively toward the receiving and holding jaws of the impaling mechanism and within the chamber between the plates 75, a feeding mechanism is provided which, in this instance, comprises an endless chain 76 passing over two sprockets 77 which are carried respectively by shafts 78 and 79, the shafts 78 and 79 being supported on brackets 80 which are in turn secured to a pair of rods 90 projected from the arms 74. These brackets 80 also support the plates 75. Arranged on the sprocket chain 76 is a number of pushing or feeding elements. These elements, in this instance, each comprise a plate 91 formed with tines or fingers and having a pair of weighted arms 92 pivoted near opposite ends of rock shafts 93 which are journalled on the sprocket chain 76. These elements are so mounted that when they pass about the sprocket wheel 77 farthest removed from the impaling mechanism, their tined portions will assume an upright position which will be held by their engagement with the sprocket chain, thus pushing or feeding those apples in the chamber between the plates 75 toward the jaws of the impaling mechanism. When the elements pass around the sprocket 77 nearest to the impaling mechanism, the weighted arms will move the tines toward the sprocket chain so as not to push the apples downwardly under the water.

To the end of preventing apples floating in that portion of the chamber beyond the end farthest removed from the impaling mechanism, a plurality of fingers 94 are projected from the portion 75ª toward the sprocket, these fingers inclining toward the sprocket chain so as to cause any apples that might collect thereon to roll toward the chain. The fingers lie on opposite sides of the chain and are adapted to pass through the spaces between the tines of the pushing or feeding elements as the latter move upwardly on the chain 76. The shaft 79 is preferably driven through a sprocket wheel 98 arranged thereon and having a sprocket chain 99 passing thereover and also over a sprocket wheel 100 on a stub shaft 101 on which a worm wheel 102 is mounted. This worm wheel meshes with a worm 103 on the shaft 53 so that the sprocket chain 76 will be driven from the shaft 53.

With the purpose in view of feeding the apples to the chamber between the plates 75, a feeding mechanism may be provided which lifts the apples from the water and drops them into the chamber. This feeding mechanism in this instance, embodies two lifters 95 arranged on opposite sides of the chamber and preferably pivoted at 96 on a bracket 97 from which the arms 90 also extend and which is secured to the arm 74. Each lifter preferably has at its forward end, a downwardly turned portion 104 which at all times lies below the surface of the water in the receptacle 66. Each lifter furthermore, has preferably a plurality of tines or fingers 105 projected upwardly therefrom in rear of its downwardly turned or deflected portion. These fingers serve to limit the movement of the apples toward the impaling mechanism on the sides of the receiving chamber.

Between the deflected ends 104 and the fingers 105, each lifter may be provided with a seat 106 for a single apple. This seat is preferably movable and to this end is pivoted at 107 to an arm 108 on the lifting member 95. A weight 109 on one side of the pivot 107 tends to hold the seat in a position at an acute angle to the adjacent plate 75 as shown in Fig. 10 of the drawings. The seat occupies this position when the lifting member 95 is lowered and as the lifting member carries the seat upwardly toward the upper edge of the plate 75, then the seat is swung on the pivot 107 against the action of the weight to throw the apple on said seat into the receiving chamber between the plates 75. This swinging of the seat 106 may be effected in any suitable manner. In this instance, each seat has a rod 110 pivotally connected therewith at 111 and depending from such pivotal connection through an abutment 112, the lower end of the rod being provided with an abutment 113 which, when engaging the abutment 112 upon the latter part of the upward movement of the lifting member 95, causes said seat to swing on its pivot 107 in the manner indicated in Fig. 10, thus throwing the apple on the seat into the chamber at the end of said chamber farthest removed from the impaling mechanism.

With the end in view of effecting the movement of the lifting members 95, each of said members has a weighted block 114 secured to the under side thereof. This block is adapted to be engaged by a cam arm 115 secured to the shaft 79, the two cam arms being arranged to operate at 180 degrees apart so that one of the lifting members is being raised while the other is lowered.

In order to prevent more than one apple passing to the position of the impaling mechanism, a gate or cut-off is arranged at the end of the chamber adjacent the impaling mechanism. This gate or cut-off, in this instance, is in the form of an arm 116 pivoted at 117 to one of the plates 75 and having a link 118 pivoted thereto at 119 and connected to one arm of a lever 120 which in turn is pivoted at 121 to one of the plates 75, this lever having a seat 122 which normally acts thereon to effect automatically the closing of the gate 116. The automatic opening of this gate is effected preferably through a projection 123 which is provided on one of the jaws 25, this cooperation being illustrated in Figs. 11, 13, 14, 15 and 17.

For the purpose of preventing the lateral movement of each lifting member 95 and at the same time to determine the amount of the descent of said lifting member, there may be provided on each side of the chamber formed by the plates 75, a rod 124 which extends through a slot 125 in the arm of the lifting member and has an abutment 126 arranged at its lower end to cooperate with the arm of the lifting member 95 to limit the descent of the lifting member under the weight 114.

So that the current in the tank 67 will not return the apples to the current producing wheel 68, there may be provided between the lifting devices and the current producing wheels, a series of fingers or arms 127 mounted to turn on a shaft 128 preferably independently of each other, each arm having a projection 129 which will cooperate with a cross bar 130 in order to prevent the movement of the fingers in one direction while permitting such movement in the other direction or the direction of the flow toward the impaling mechanism.

In the operation of the invention, the apples are dumped into the receptacle 67 adjacent the current producing wheels 68 and are carried past the fingers 127, being deflected by the portion 75ª toward the lifting devices on opposite sides of the receiving chamber formed by the plates 75. One or more of the apples will pass onto each lifting member, but owing to the restricted size of the seat 106, only one apple will be received thereon. If more than one apple should rest on this seat, all but one would be displaced therefrom, either during the elevation of the lifting member 95 or the movement of the seat on such lifting member, due to the engagement of the abutment 113 with the abutment 112. The apple on the seat 106, when the lifting member reaches its uppermost position, is deposited through the movement of the seat into the chamber between the plates 75 at the end of the endless conveyor 76 which is farthest removed from the impaling mechanism. Should any of the apples fall or collect on the inclined fingers 94, the latter will direct them toward the endless conveyor 76. The pushers 91 pass upwardly adjacent the fingers 94 and engage the apples moving them toward the gate 116 which is closed until the jaws of the impaling mechanism move to the receiving position. The movement of the impaling means is effected in timed relation to the rotary reel 1 on which the fruit supporting devices or forks 12 are mounted and when the arm 23 swings downwardly, should the jaws be closed, the projections 57 will engage with the cam faces 71 and move the jaws 25 away from each other. Later on, the projection 123 on one of the jaws will engage the lever 122 and move the gate 116 to open position, as shown in Fig. 15. The current of the water as well as the pushers 91 will cause one of the apples to enter between the jaws 24, this of course, taking place when the rest 33 is arranged below the surface of the water and out of the path of the largest floating apple. The arm 23 now proceeds to move upwardly and the apple will come to rest upon the rest 33, while at the same time the arms 23 will close about it, due to the release of the arms by the detent 131, thus tending to center the same on the seat 33. In this centered position it is carried by the arm 23 to the fork or supporting device 12. After it has been forced on the fork or supporting device, the apple is freed from the jaws due to the fact that the cam device 56 will operate on the pins or projections 57 as shown in Fig. 5 of the drawings. With the release of the apple, the arm 23 with the jaws held open by the detent 131, moves away from the fork so as to permit the reel to present the apple to the paring mechanism and the paring or coring takes place in the usual manner. A yielding device is provided so that apples of different sizes may be impaled upon the fork or supporting device by the impaling mechanism.

From the foregoing it will be seen that there has been provided a paring machine in which the impaling mechanism is operated through a simple and durable construction which permits the yielding of the mechanism to accommodate fruit of different sizes. A rest for the fruit in the fruit holding means is employed which is adjustable with reference to the fruit holding jaws to adapt the machine to different sizes of apples. The fruit holding means is adjustable on its supporting member or arm so as to permit the holding means to be centered with reference to the fork or supporting device. A fruit holding means is employed which has a rest movable below the surface of the water in the water receptacle and jaws cooperating with this rest and formed so as to permit the fruit to float above the rest between the jaws. The jaws are operated in such a manner as to release the fruit while it is on the holding device, the jaws being held open until they pass below the water and thereafter being closed upon the fruit before the latter is removed from the water. This arrangement not only permits the jaws to receive the fruit immediately that they enter the receptacle, but it prevents the agitation of the water in the receptacle due to the opening of the jaws. The supporting member for the jaws is so formed that it may straddle the side walls of the water receptacle. A receiving chamber is provided in the water receptacle having an outlet which directs the fruit one at a time to the holding means of the impaling mechanism. This outlet is controlled by a gate which is normally closed, but is opened automatically upon the presentation of the holding means to the outlet. The fruit is fed toward the outlet by a pushing mechanism in connection with means which creates a flow of water in the receptacle toward the outlet. Lifting devices are arranged on opposite sides of the receiving chamber and the two lifting devices are alternately operated by a novel operating mechanism. The lifting means is of novel construction and is so formed as to prevent the fruit passing beyond it or under it. It also insures the displacement of the fruit from the lifting mechanism into the receiving chamber.

What I claim as my invention and desire to secure by Letters Patent is:

1. In combination with a device for supporting fruit during the paring thereof, a mechanism for impaling the fruit thereon embodying a movably mounted member, jaws on said member for applying fruit to the supporting device, spring means acting on the jaws to hold them in closed position, mechanism for opening said jaws against the action of the spring means while the jaws are in engagement with the fruit and the latter has been impaled upon the supporting device, a detent for holding said jaws in open position against the action of the spring means during the movement of the jaws away from impaling position, and means for releasing said jaws from the detent to the action of the spring means as the jaws move toward the supporting device.

2. The combination with a device for supporting fruit during the paring thereof, rotatable about a horizontal axis, of mechanism for impaling the fruit upon said supporting device comprising an arm pivoted below the axis of turning of the supporting device, a rest on the arm arranged to occupy a substantially horizontal position when the arm is in its lowermost position, fruit holding jaws carried by the arm to grip a fruit on the rest, means for effecting the closing of the jaws upon the fruit on the rest, and means for effecting the opening of the jaws after the fruit has been impaled upon the rotary supporting device.

3. The combination with a device for supporting fruit during the paring thereof rotatable about a horizontal axis, of mechanism for impaling the fruit upon said supporting device comprising an arm pivoted below the axis of turning of the supporting device, a fruit rest on the arm arranged to occupy a substantially horizontal position when the arm is in its lowermost position, fruit holding jaws carried by the arm to grip a fruit on the rest, spring means acting on the jaws to close the jaws, a detent for holding the jaws against the action of the spring means after a fruit has been impaled upon the impaling means, means for holding the jaws open against the action of the spring means as the arm moves from the impaling means to its lowermost position, and means for releasing said jaws to the spring means as the arm moves toward the impaling means.

4. The combination with a device for supporting fruit during the paring thereof rotatable about a horizontal axis, of mechanism for impaling the fruit upon said supporting device comprising an arm pivoted below the axis of turning of the supporting device, a fruit rest on the arm arranged to occupy a substantially horizontal position when the arm is in its lowermost position, fruit holding jaws carried by the arm to grip a fruit on the rest, spring means acting on the jaws to close the jaws, a detent for holding the jaws against the action of the spring means, a detent for holding the jaws against closing under the spring means, means for effecting the opening of the jaws after the fruit has been impaled upon the supporting device, and means for actuating the detent to permit the jaws to close upon the fruit as the arm moves toward the supporting device from the horizontal position of the rest.

5. The combination with a device on which the fruit is supported during paring, of mechanism for impaling the fruit upon said device embodying a pivoted arm, fruit holding means carried by the arm, a yielding pitman connected with said arm provided with a slot, and a rotary cam connecting with said pitman to operate the latter and having its shaft extending through said slot to guide the pitman.

6. The combination with a device on which the fruit is supported during paring, of mechanism for impaling fruit upon said device comprising a pivotally mounted arm, fruit holding jaws carried by said arm, and a rest for the fruit held by the jaws adjustable with reference to the jaws while the jaws are stationary to accommodate fruit of different sizes.

7. The combination with a device on which the fruit is supported during the paring thereof, of a pivotally mounted arm, and fruit holding jaws adjustable together on said arm to permit the jaws to be centered with reference to said fruit holding device.

8. The combination with a fruit holding device, of mechanism for impaling fruit on the fruit holding device comprising a pivotally mounted arm, a bracket adjustable on said arm about an axis parallel with the turning axis of the arm, and fruit holding means carried by said bracket and adapted to present the fruit to the fruit holding device on which the fruit is pared.

9. The combination with a device for supporting the fruit, of mechanism for impaling fruit upon the fruit holding device comprising a pivotally mounted arm, a bracket adjustable on said arm about an axis parallel with the axis of turning of the arm, fruit holding jaws movably mounted on said bracket, and a fruit rest adjustably mounted on said bracket in relation to said jaws to permit the holding of fruit of different sizes.

10. The combination with a device for supporting the fruit during the paring thereof, of mechanism for impaling fruit upon said device embodying a movably mounted member, a pair of jaws connected to said member for applying the fruit to the supporting device, and a camming device for cooperating with said jaws to release the fruit after it has been applied to the supporting device.

11. The combination with a device for supporting the fruit during the paring thereof, and mechanism for impaling the fruit upon said supporting device comprising a swinging arm, and holding jaws movably mounted on said arm, of means for opening the jaws comprising a camming device cooperating with said holding jaws, an arm by which said camming device is carried mounted to turn about an axis common to the axis of turning of the swinging arm, a lever pivotally mounted at one end and pivotally connected to the arm of the camming device, and a camming device cooperating with said lever to effect the movement of the camming device on the arm to open the jaws after the fruit has been applied to the supporting device on which the paring takes place.

12. The combination with a device for supporting the fruit during the paring thereof, of mechanism for impaling fruit upon the supporting device comprising an arm formed with a crook, fruit holding means carried by the arm, and a receptacle situated to one side of the pivot of the arm and adapted to have the arm swing downwardly therein to receive the fruit from said receptacle, the crook in the arm permitting the latter to straddle a side wall of the receptacle.

13. The combination with a device for supporting fruit during the paring thereof, and a water receptacle in which the fruit is floated, of an impaling mechanism for receiving the fruit from the water receptacle and applying it to the supporting device, said impaling mechanism comprising a rest, and jaws arranged to cooperate with fruit on the rest, the rest being movable below the surface of the liquid and the jaws being spaced so as to permit the fruit to float between them to a point above the rest and to be removed from the jaws in a direction perpendicular to the supporting surface of the rest.

14. The combination with a device for supporting fruit during the paring thereof, and a water receptacle in which the fruit is floated, of mechanism for transferring the fruit from the receptacle to the supporting device embodying a rest movable to a position below the water of the receptacle, and jaws associated with said rest and spaced apart to permit the fruit to float between them above the rest and to be removed from them in a direction perpendicular to the surface of the rest, means for holding the jaws open while they are in the receptacle and means for opening the jaws after the fruit has been applied to the supporting device.

15. The combination with a device for supporting the fruit during the paring thereof, and a water receptacle in which the fruit is floated, a frame on which the supporting device is supported having an arm projected therefrom and extended downwardly into the water receptacle, a swinging arm pivoted on said frame to one side of the water receptacle and having a crook therein permitting its free end to swing into the water receptacle, fruit holding means on the arm movable by said arm into the water receptacle and having movable jaws, and means for holding the jaws open while the jaws are within the water receptacle.

16. The combination with a device for supporting the fruit during the paring thereof, and a water receptacle in which the fruit is floated, of impaling means for receiving the fruit from the water receptacle and delivering it to the supporting device, said impaling means being movable to carry the fruit from the tank to the supporting device and embodying relatively movable jaws between which the fruit is floated, and means for delivering the fruit one at a time to said jaws embodying a chamber situated to one side of the jaws when the latter are arranged in the water receptacle so that the fruit may float from said chamber to the jaws.

17. The combination with a device for supporting the fruit during the paring thereof, and a water receptacle in which the fruit is floated, of impaling means for receiving the fruit from the water receptacle and delivering it to the supporting device, said impaling means being movable to carry the fruit from the tank to the supporting device and embodying relatively movable jaws between which the fruit is floated, means for delivering the fruit one at a time to said jaws embodying a chamber situated to one side of the jaws when the latter are arranged in the water receptacle so that the fruit may float from said chamber to the jaws, and means for closing the outlet from said chamber when the jaws are removed from the water receptacle, said means opening the outlet to the jaws when the latter enter the water receptacle.

18. The combination with a device for supporting the fruit during paring, and a water receptacle in which the fruit is floated, relatively movable jaws movable into the water receptacle to a position where the fruit in the receptacle will float between the jaws and movable to the supporting device to feed the fruit received from the receptacle to said supporting device, a chamber in the receptacle situated to one side of the position of the jaws when the latter are in the receptacle and opening toward the jaws to permit the fruit to float from the chamber to the jaws, a gate arranged to close the outlet of the chamber to the jaws, and means for effecting the opening of the gate as the jaws enter the water receptacle.

19. The combination with a water receptacle in which the fruit is floated, of mechanism arranged to receive and center the fruit while it is floating in said water, a chamber in the receptacle arranged to deliver floating fruit to the receiving and centering means, and mechanism operating in said chamber to push the floating fruit toward the receiving and centering means.

20. The combination with a water receptacle in which the fruit is floated, of mechanism arranged to receive and center the fruit while it is floating in said water, a chamber in the receptacle arranged to deliver floating fruit to the receiving and centering means, and mechanism operating in said chamber to push the floating fruit toward the receiving and centering means, said mechanism comprising an endless carrier, and pushing elements pivotally mounted on the carrier.

21. The combination with a water receptacle, and means for receiving and centering fruit floating in said receptacle, of a chamber arranged to deliver the fruit to said receiving and centering means, said chamber having one end opening to the receiving and centering means, and its opposite end closed, means for moving the fruit from the closed end toward the open end, means for lifting the apples from the receptacle outside of the chamber to that portion enclosed by the chamber, and an inclined device arranged in the closed end of the chamber for preventing the fruit from passing under the conveyor at the forward end thereof.

22. In combination with a water receptacle, and means for receiving and centering fruit floating in said receptacle, of a chamber arranged to deliver the fruit to said receiving and centering means, said chamber having one end opening to the receiving and centering means, and its opposite end closed, means for moving the fruit from the closed end toward the open end, means for lifting the apples from the receptacle outside of the chamber to that portion enclosed by the chamber, an inclined device arranged in the closed end of the chamber for preventing the fruit from passing under the conveyor at the forward end thereof, and a gate arranged at the outlet of the chamber to hold the fruit from passing through said outlet, said gate being movable to permit the passage from the outlet to the receiving and centering means at the desired time.

23. The combination with a water holding receptacle, and means for receiving and centering fruit floating in said receptacle, of a chamber in the receptacle opening to said means, and a lifter movably mounted in the receptacle and having a movably mounted seat thereon arranged to discharge the fruit into the compartment when the lifter is moved upwardly.

24. The combination with a receptacle for holding water, and means for receiving and centering fruit floating on said water, of a compartment connecting with said receiving and centering means, a lifting device for lifting the fruit in the receptacle and discharging it into the compartment, said lifting device having a movably mounted seat, and means for moving said seat on the lifting device to discharge the fruit into the compartment as the lifting device moves upwardly.

25. The combination with a receptacle for holding water, and means for receiving and centering fruit floating in said receptacle, of a compartment opening to said receiving and centering means, a pivotally mounted lifting device, a pivotally mounted seat for the fruit on said lifting device, and means for moving said pivotally mounted seat to discharge fruit thereon into the compartment as the lifting device moves upwardly.

26. The combination with a receptacle for holding water, and means for receiving and centering fruit floating in said water, of a compartment opening to said receiving and centering means, a lifting device movable in the receptacle at one side of the compartment, a pivotally mounted seat for the fruit arranged on said lifting device, a rod connected with said seat and having an abutment, and a fixed abutment for cooperating with the abutment on the rod to move the seat in order to discharge the fruit into the compartment as the lifting device moves upwardly.

27. The combination with a receptacle for holding water, and means for receiving and centering fruit floating in the water of the receptacle, of means for creating a current toward said receiving and centering means, a compartment in said receptacle opening to said receiving and centering means, and two lifting devices arranged on opposite sides of the compartment pivoted at their ends adjacent the receiving and centering means and having their free ends provided with downwardly extending portions, seats on the lifting devices adjacent their free ends, and stops on the lifting devices in rear of the seats to prevent the floating apples passing beyond said seats.

28. The combination with a receptacle for holding water, and means for receiving and centering fruit floating in the water of the receptacle, of means for creating a current toward said receiving and centering means, a compartment in said receptacle opening to said receiving and centering means, and two lifting devices arranged on opposite sides of the compartment, pivoted at their ends adjacent the receiving and centering means and having their free ends provided with downwardly extending portions, seats on the lifting devices adjacent their free ends, stops on the lifting devices in rear of the seats to prevent the floating apples passing beyond said seats, and means operating in the compartment to push the fruit toward the receiving and centering means, said pushing means having a shaft extending from opposite sides of the compartment, and cams on said shaft cooperating with the lifting devices to alternately effect the upward movement of the latter.

29. The combination with a device for supporting the fruit during the paring thereof, of mechanism for impaling fruit upon said device embodying a movably mounted member, jaws connected to said member for applying the fruit to the supporting device, mechanism for opening said jaws while the jaws engage the fruit on the supporting device, detaining means for holding said jaws open during the movement away from the supporting device, and means for releasing said detaining means to permit the jaws to close upon the fruit on the movement of said jaws toward the supporting device.

30. The combination with a device for supporting the fruit during the paring thereof, and a receptacle for holding water in which fruit is floated, of mechanism for removing the fruit from the water and impaling it upon the supporting device comprising a movably mounted member, a rest for the fruit movable by said member below the surface of the water, jaws for centering the fruit above the rest, and means for effecting the closing of the jaws upon the fruit above the rest after the rest has started on its movement toward the supporting means and before the fruit has been removed from the water.

31. The combination with a device for supporting the fruit during the paring thereof, and a water receptacle in which the fruit is floated, of mechanism for removing the fruit from the water receptacle and impaling it upon the supporting means comprising a movably mounted member, a rest carried by said member below the surface of the water, jaws centering the fruit upon the rest, means for opening said jaws after the fruit has been impaled upon the supporting device and while the jaws engage the fruit, means for holding the jaws open while they are carried into the water, and means for effecting the closing of the jaws on the return movement of the member toward the supporting device.

32. The combination with a device for supporting the fruit during the paring thereof, and a water receptacle in which the fruit is floated, of mechanism for removing the fruit from the water receptacle and impaling it upon the supporting device comprising a movably mounted member, a rest carried by said movably mounted member and movable with the latter below the surface of the water, centering jaws for centering the fruit upon the rest, means for opening the jaws after the fruit has been impaled upon the supporting device and before the jaws reach the water, and means for effecting the closing of the jaws before the jaws pass from the water.

33. The combination with a device for supporting the fruit during the paring thereof, and a water receptacle in which the fruit is floated, of mechanism for removing the fruit from the water receptacle and impaling it on the supporting device comprising a movably mounted member, a rest for the fruit carried by said member below the surface of the water in the water receptacle, centering jaws carried by the member for centering the fruit on the rest, means for opening said jaws after the fruit has been impaled upon the supporting device and before the jaws pass below the surface of the water, and means for effecting the closing of the jaws before the rest has moved from the water.

34. The combination with a device for supporting the fruit during the paring thereof, and a water receptacle in which the fruit is floated, of mechanism for removing the fruit from the water receptacle and impaling it on the supporting device comprising a movably mounted member, a rest for the fruit carried by said member below the surface of the water in the water receptacle, centering jaws carried by the member for centering the fruit on the rest, means for opening the jaws after the fruit has been impaled upon the supporting device, a detent for holding said jaws open during the movement of the jaws into the water, and means for operating the detent to release the jaws on the movement of the jaws toward the impaling device and before the fruit is carried from the water of the water receptacle.

35. The combination with a device for supporting the fruit during the paring thereof, and a water receptacle in which the fruit is floated, of mechanism for removing the fruit from the water receptacle and impaling it on the supporting device comprising a movably mounted member, a rest for the fruit carried by said member below the surface of the water in the water receptacle, centering jaws carried by the member for centering the fruit on the rest, means for opening the jaws after the fruit has been impaled upon the supporting device and while the fruit is on the supporting device, a detent for holding the jaws open until the rest passes below the surface of the water in the water receptacle, and an abutment for engaging the detent upon the movement of the jaws toward the supporting device to release said detent, said abutment being movably mounted so as to be deflected by the detent on the movement of the jaws toward the water receptacle.

BURTON C. COONS.